(12) United States Patent
Areno et al.

(10) Patent No.: US 11,347,861 B2
(45) Date of Patent: May 31, 2022

(54) CONTROLLING SECURITY STATE OF COMMERCIAL OFF THE SHELF (COTS) SYSTEM

(71) Applicant: Raytheon Company, Waltham, MA (US)

(72) Inventors: Matthew C. Areno, Round Rock, TX (US); John C. Hoffman, Fairview, TX (US)

(73) Assignee: Raytheon Company, Waltham, MA (US)

( * ) Notice: Subject to any disclaimer, the term of this patent is extended or adjusted under 35 U.S.C. 154(b) by 305 days.

(21) Appl. No.: 16/255,917

(22) Filed: Jan. 24, 2019

(65) Prior Publication Data

US 2019/0311126 A1    Oct. 10, 2019

Related U.S. Application Data

(60) Provisional application No. 62/655,559, filed on Apr. 10, 2018.

(51) Int. Cl.
*G06F 21/57* (2013.01)
*G06F 21/44* (2013.01)
(Continued)

(52) U.S. Cl.
CPC ............ *G06F 21/575* (2013.01); *G06F 21/44* (2013.01); *H04L 9/0631* (2013.01);
(Continued)

(58) Field of Classification Search
CPC ........ G06F 21/57; G06F 21/575; G06F 21/44; G06F 21/572; G06F 21/60; G06F 21/70;
(Continued)

(56) References Cited

U.S. PATENT DOCUMENTS 6,473,857 B1    10/2002  Panas et al.
7,260,555 B2     8/2007  Rossmann et al.
(Continued)

FOREIGN PATENT DOCUMENTS

EP    1 764 721 A2    3/2007
EP    3 422 661 A1    1/2019
(Continued)

OTHER PUBLICATIONS

PCT International Preliminary Report dated Oct. 22, 2020 for International Application No. PCT/US2019/022879; 9 Pages.
(Continued)

*Primary Examiner* — Shaqueal D Wade-Wright
(74) *Attorney, Agent, or Firm* — Daly, Crowley, Mofford & Durkee, LLP

(57) ABSTRACT

The concepts, systems and methods described herein are directed towards a method for secure booting running on a security device. The method is provided to include: receiving a public key from a security device; validating the security device by comparing the received public key with a hash code; in response that the security device is validated, receiving custom codes from the security device and storing the custom codes in a microprocessor, wherein the microprocessor is located in a programmable memory of a primary processor; programming the programmable memory by executing the custom codes; and executing a boot sequence of the primary processor by the programmable memory.

18 Claims, 5 Drawing Sheets

(51) Int. Cl.
*H04L 9/32* (2006.01)
*H04L 9/06* (2006.01)

(52) U.S. Cl.
CPC .......... *H04L 9/0643* (2013.01); *H04L 9/3278* (2013.01); *G06F 21/572* (2013.01)

(58) Field of Classification Search
CPC ..... G06F 21/71; H04L 9/3278; H04L 9/0643; H04L 9/0631; H04L 9/3236; H04L 9/0866; H04L 9/3234; H04L 9/0897
See application file for complete search history.

(56) References Cited

U.S. PATENT DOCUMENTS

| | | | |
|---|---|---|---|
| 9,235,709 B2 | 1/2016 | Kim et al. | |
| 9,251,343 B1 | 2/2016 | Vincent et al. | |
| 9,319,380 B2 | 4/2016 | Lukacs et al. | |
| 9,509,587 B1 | 11/2016 | Marquardt et al. | |
| 9,600,291 B1* | 3/2017 | Atsatt | G06F 9/4401 |
| 9,626,512 B1 | 4/2017 | Brandwine et al. | |
| 10,027,717 B2 | 7/2018 | Ben-Shalom et al. | |
| 2004/0003262 A1 | 1/2004 | England et al. | |
| 2004/0177260 A1 | 9/2004 | Gilfix et al. | |
| 2005/0138409 A1 | 6/2005 | Sheriff et al. | |
| 2006/0015748 A1 | 1/2006 | Goto et al. | |
| 2006/0026417 A1 | 2/2006 | Furusawa et al. | |
| 2008/0307488 A1 | 12/2008 | Hammond, II et al. | |
| 2009/0204964 A1 | 8/2009 | Foley et al. | |
| 2010/0070743 A1 | 3/2010 | Grigor et al. | |
| 2010/0250796 A1 | 9/2010 | Jevans et al. | |
| 2011/0302638 A1* | 12/2011 | Cha | G06F 21/57 726/6 |
| 2014/0068275 A1 | 3/2014 | Swanson et al. | |
| 2014/0298026 A1 | 10/2014 | Isozaki et al. | |
| 2015/0012737 A1* | 1/2015 | Newell | G06F 21/575 713/2 |
| 2016/0125187 A1 | 5/2016 | Oxford | |
| 2016/0147996 A1 | 5/2016 | Martinez | |
| 2016/0162669 A1 | 6/2016 | Mikhailov et al. | |
| 2016/0378996 A1 | 12/2016 | Smith et al. | |
| 2017/0104770 A1* | 4/2017 | Jreij | H04L 63/20 |
| 2017/0132417 A1 | 5/2017 | Martinez | |
| 2017/0180318 A1 | 6/2017 | Lutas et al. | |
| 2017/0213053 A1 | 7/2017 | Areno et al. | |
| 2017/0364685 A1 | 12/2017 | Shah et al. | |
| 2018/0034793 A1 | 2/2018 | Kibalo et al. | |
| 2018/0089425 A1 | 3/2018 | Trikalinou | |
| 2018/0165448 A1 | 6/2018 | Nightingale et al. | |
| 2018/0255077 A1 | 9/2018 | Paine | |
| 2018/0260009 A1* | 9/2018 | Roeder | G06F 1/24 |
| 2018/0278418 A1* | 9/2018 | Chang | H04L 9/0869 |
| 2018/0365425 A1 | 12/2018 | Packer Ali et al. | |
| 2019/0042516 A1* | 2/2019 | Browning | H05K 1/029 |
| 2019/0050604 A1* | 2/2019 | Weber | G06F 21/73 |
| 2019/0073478 A1* | 3/2019 | Khessib | G06F 21/572 |
| 2019/0266331 A1* | 8/2019 | Sanchez Diaz | G06F 21/00 |
| 2021/0034733 A1* | 2/2021 | Grobelny | G06F 21/44 |

FOREIGN PATENT DOCUMENTS

| | | |
|---|---|---|
| KR | 10-1772314 B1 | 9/2017 |
| WO | WO 2010/030157 A1 | 3/2010 |
| WO | WO 2019/023289 A1 | 1/2019 |

OTHER PUBLICATIONS

U.S. Appl. No. 16/722,142, filed Dec. 20, 2019, Hird et al.
U.S. Appl. No. 16/832,192, filed Mar. 27, 2020, Staab.
U.S. Appl. No. 16/832,216, filed Mar. 27, 2020, Staab et al..
U.S. Non-Final Office Action dated May 14, 2020 for U.S. Appl. No. 16/214,857; 23 Pages.
PCT International Search Report and Written Opinion dated Jun. 26, 2020 for International Application No. PCT/US2019/045608; 16 Pages.
PCT International Search Report and Written Opinion dated Jun. 25, 2020 for International Application No. PCT/US2020/025178; 12 Pages.
PCT International Search Report and Written Opinion dated Aug. 11, 2020 for International Application No. PCT/US2019/045607; 12 Pages.
U.S. Notice of Allowance dated Aug. 24, 2020 for U.S. Appl. No. 16/214,857; 7 Pages.
PCT International Search Report and Written Opinion dated Jul. 13, 2020 for International Application No. PCT/US2020/025195; 12 Pages.
PCT International Search Report and Written Opinion dated Jul. 14, 2020 for International Application No. PCT/US2019/045610; 12 Pages.
Response to U.S. Non-Final Office Action dated May 14, 2020 for U.S. Appl. No. 16/214,857; Response Filed Jul. 30, 2020; 7 Pages.
Lohrke et al., "No Place to Hide: Contactless Probing of Secret Data on FPGAs;" Conference Paper from International Conference on Cryptographic Hardware and Embedded Systems (CHES 2016); Aug. 4, 2016; pp. 147-167; 21 Pages.
PCT International Search Report and Written Opinion dated May 31, 2019 for International Application No. PCT/US2019/022879; 16 Pages.
U.S. Appl. No. 16/214,857, filed Dec. 10, 2018, Areno et al.
U.S. Appl. No. 16/371,191, filed Apr. 1, 2019, Areno et al.
U.S. Appl. No. 16/398,641, filed Apr. 30, 2019, Areno et al.
Cooper et al., "BIOS Protection Guidelines," *National Institute of Standards and Technology*—Special Publication 800-147; U.S. Department of Commerce; Apr. 2011; 26 Pages.
Regenscheid et al., "BIOS Integrity Measurement Guidelines (Draft);" *National Institute of Standards and Technology*—Special Publication 800-155; U.S. Department of Commerce; Dec. 2011; 47 Pages.
Regenscheid, "BIOS Protection Guidelines for Servers;" *National Institute of Standards and Technology*—NIST Special Publication 800-147B; U.S. Department of Commerce; Aug. 2014; 32 Pages.
Trusted Computing Group, "Trusted Platform Module Library, Part 1: Architecture;" Family "2.0", Level 00, Revision 01.16; TCG Published; Oct. 30, 2014; 147 Pages (Part 1 of 2).
Trusted Computing Group, "Trusted Platform Module Library, Part 1: Architecture;" Family "2.0", Level 00, Revision 01.16; TCG Published; Oct. 30, 2014; 121 Pages (Part 2 of 2).
Wilkins et al., "UEFI Secure Boot in Modern Computer Security Solutions;" www.UEFI.org; Sep. 2013; 10 Pages.
U.S. Non-Final Office Action dated Dec. 3, 2020 for U.S. Appl. No. 16/371,191; 18 Pages.
Non-Final Office Action dated Apr. 29, 2021 for U.S. Appl. No. 16/398,641; 38 Pages.
Response to U.S. Final Office Action dated Mar. 16, 2021 for U.S. Appl. No. 16/371,191; Response filed on Jun. 15, 2021; 11 pages.
Response to U.S. Non-Final Office Action dated Decembers, 2020 for U.S. Appl. No. 16/371,191; Response filed on Feb. 23, 2021; 8 pages.
U.S. Final Office Action dated Mar. 16, 2021 for U.S. Appl. No. 16/371,191 ;16 pages.
PCT International Preliminary Report dated Mar. 18, 2021 for International Application No. PCT/US2019/045607; 7 Pages.
PCT International Preliminary Report dated Mar. 18, 2021 for International Application No. PCT/US2019/045610; 7 Pages.
PCT International Preliminary Report dated Mar. 18, 2021 for International Application No. PCT/US2019/045608; 11 Pages.
Response to U.S. Non-Final Office Action dated Apr. 29, 2021 for U.S. Appl. No. 16/398,641; Response filed on Jul. 23, 2021; 10 pages.
Response to Non-Final Office Action filed Sep. 27, 2021 for U.S. Appl. No. 16/371,191; 11 Pages.
International Preliminary Report on Patentability dated Oct. 14, 2021 for PCT Application No. PCT/US2020/025195; 7 Pages.
International Preliminary Report on Patentability dated Oct. 14, 2021 for PCT Application No. PCT/US2020/025178; 7 Pages.
U.S. Non-Final Office Action dated Jun. 30, 2021 for U.S. Appl. No. 16/371,191; 16 pages.

(56) References Cited

OTHER PUBLICATIONS

Office Action dated Dec. 27, 2021 for U.S. Appl. No. 16/371,191; 17 Pages.

* cited by examiner

CONTROLLING SECURITY STATE OF COMMERCIAL OFF THE SHELF (COTS) SYSTEM

CROSS REFERENCE TO RELATED APPLICATIONS

The present application claims the benefit of U.S. Provisional Patent Application No. 62/655,559, filed on Apr. 10, 2018, entitled "APPARATUS, SYSTEM, AND METHOD FOR CONTROLLING SECURITY STATE ON COTS MICROPROCESSORS USING A SECURE CO-PROCESSOR," which is incorporated herein by reference.

BACKGROUND

Establishing trust with a commercial off the shelf (COTS) processor, such as an INTEL Central Processing Unit (CPU), is a known problem with no known, fully-accepted solutions. The COTS processors usually use a closed-source model for the boot-code which are stored inside the processors. Thus, monitoring or control by third parties for the processors are prevented. There are existing solutions for the high level of control over the processors, for example Joint Test Action Group (JTAG) interface. However, the JTAG interface is known to be slow and invasive.

SUMMARY

In accordance with the concepts, techniques and systems described herein is an efficient method for providing a secure booting process. The techniques and systems described herein may provide a security solution working on a modern system having a microprocessor architecture.

According to one illustrative embodiment, a method for secure booting may include: receiving a public key from a security device; validating the security device by comparing the received public key with a hash code; in response that the security device is validated, receiving custom codes from the security device and storing the custom codes in a microprocessor, wherein the microprocessor is located in a programmable memory of a primary processor; programming the programmable memory by executing the custom codes; and executing a boot sequence of the primary processor by the programmable memory.

In one aspect, the security device may comprise a Hardware Root of Trust (HRoT) device.

In one aspect, the microprocessor may comprise a Secure Device Manager (SDM).

In one aspect, the programmable memory may comprise a Field-Programmable Gate Array (FPGA).

In one aspect, the method may further include monitoring, by the security device, the normal boot sequence of the primary processor.

In one aspect, the method may further include filtering, by the security device, messages to and from the primary processor.

In one aspect, the step of programming the first memory may further include: loading, authenticating, decrypting and programming programmable logic of the programmable memory; and loading, authenticating, decrypting and transmitting the image of the programmable memory to a Platform Controller Hub (PCH).

In one aspect, the security device, the primary processor, and the programmable memory are connected through a Peripheral Component Interconnect Express (PCIe) bus.

In one aspect, the custom codes may comprise Physically Unclonable Function (PUF) to protect the rest of the custom codes. Herein, the PUF may be encrypted by a secure key stored in the security device, and is decrypted by the secure key to protect the rest of the custom codes.

In one aspect, the custom codes are encrypted with Advanced Encryption Standard (AES).

In one aspect, the step of executing the boot sequence of the primary processor may further include: executing a Unified Extensible Firmware Interface (UEFI) boot sequence for the primary processor.

According to another illustrative embodiment, a system for secure booting may include: a primary processor comprising a Field-Programmable Gate Array (FPGA); and a security device. Herein, the primary processor may be configured to: receive a public key from the security device; validate the security device by comparing the received public key with a hash code; in response that the security device is validated, receive custom codes from the security device and store the custom codes in a Secure Device Manager (SDM), wherein the SDM is located in the FPGA; program the FPGA by executing the custom codes; and execute a boot sequence for the primary processor by the programmed FPGA.

In one aspect, the security device, the primary processor, and the FPGA may be connected through a Peripheral Component Interconnect Express (PCIe) bus.

In one aspect, the primary processor may further include a BootROM, wherein the BootROM executes the custom codes stored in the SDM.

In one aspect, the primary processor may further include a Platform Controller Hub (PCH). Herein, the FPGA and the PCH may be connected via an emulated Quad Serial Peripheral Interface (QSPI).

In one aspect, the security device may comprise a Hardware Root of Trust (HRoT) device.

The details of one or more embodiments of the disclosure are outlined in the accompanying drawings and the description below. Other features, objects, and advantages of the disclosure will be apparent from the description and drawings, and from the claims.

BRIEF DESCRIPTION OF THE DRAWINGS

The foregoing features may be more fully understood from the following description of the drawings in which.

DETAILED DESCRIPTION

Relative descriptions used herein, such as left, right, up, and down, are with reference to the figures, are merely relative and not meant in a limiting sense. Additionally, for clarity, common items and circuitry, such as integrated circuits, resistors, capacitors, transistors, and the like, have not been included in the figures, as can be appreciated by those of ordinary skill in the pertinent art. Unless otherwise specified, the illustrated embodiments may be understood as providing illustrative features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed concepts, systems, or methods. Additionally, the shapes and sizes of components are intended to be only illustrative and unless otherwise specified, can be altered without materially affecting or limiting the scope of the concepts sought to be protected herein.

For convenience, certain introductory concepts and terms used in the specification are collected here.

As used herein, the term "Root of Trust (RoT)" is used to describe a trusted computing module that provides a set of functions that are trusted by other modules in a computing environment, such as an Operating System (OS). The RoT may serve as an independent computing module providing authenticity in a computer or mobile device in which it is embedded. The term "Hardware Root of Trust (HRoT)" device is used to describe a hardware device that provides RoT functions. The HRoT device generally provides, but is not limited to, performing device authentication to ensure that hardware has not been tampered with; verifying the authenticity of software, particularly boot images, to ensure they haven't been tampered with; providing One-Time Programmable (OTP) memory for secure key storage to facilitate encryption; and ensuring that the system is able to be brought into a known and trusted state.

As used herein, the term "physical unclonable function (PUF)" is used to describe a "digital fingerprint" for a semiconductor device such as a microprocessor, where the PUF serves as a unique identity for the semiconductor device. A PUF can be generated based upon physical variations of the semiconductor, which occur naturally during its manufacturing. Accordingly, it is possible to differentiate semiconductors based on the PUF. That is, a PUF is a physical entity that is embodied in a physical structure of a semiconductor that uniquely identifies the semiconductor.

Figure 1:
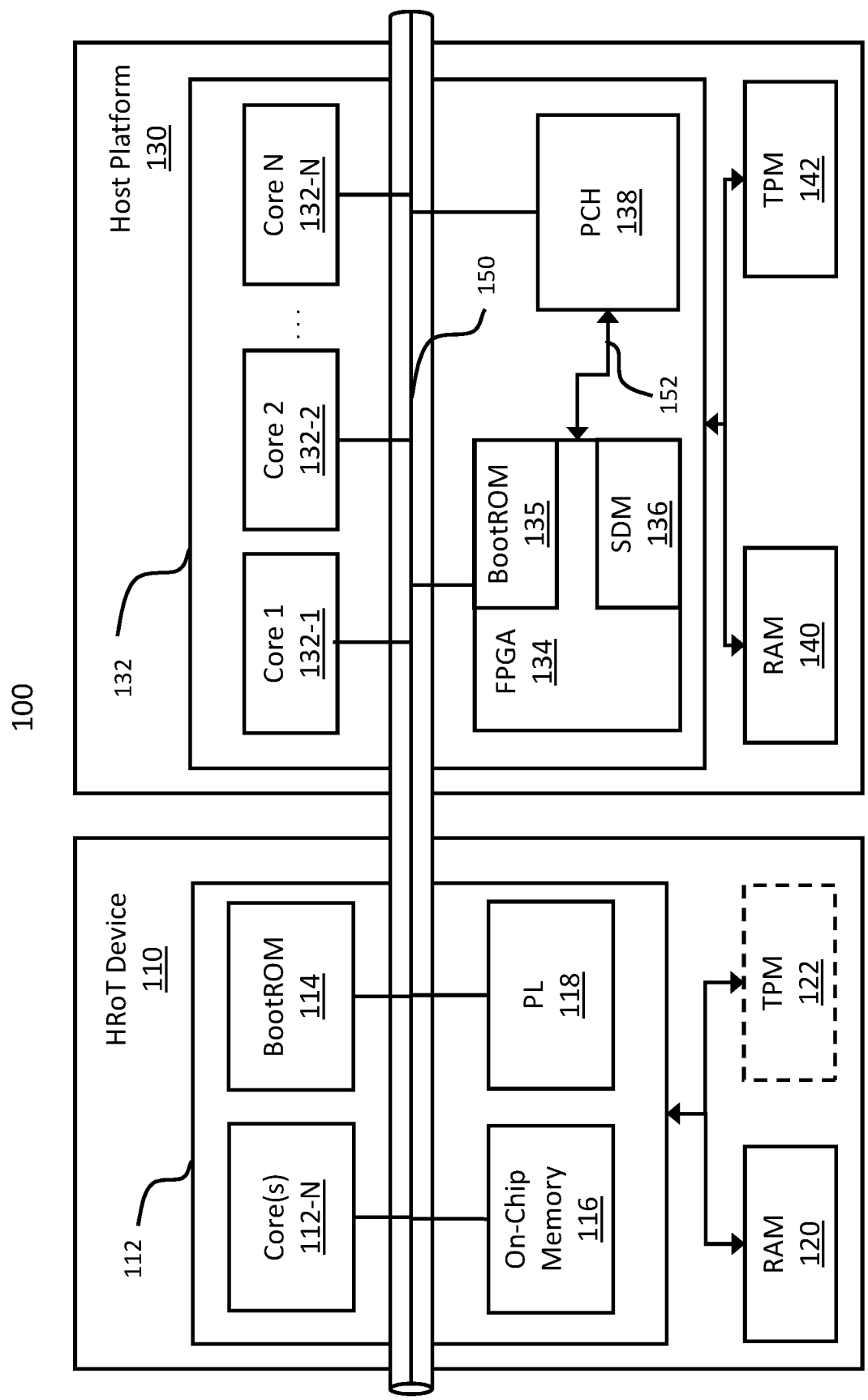
FIG. 1 is a block diagram of an illustrative security system including a Hardware Root of Trust (HRoT) device connected to a Commercial Off-the-Shelf (COTS) device according to the concepts described herein.

Referring now to FIG. 1, an illustrative security system 100 may include a Hardware Root of Trust (HRoT) device 110 and a host platform 130 in accordance with example embodiments of the invention. The HRoT device 110 may comprise a security device that provides a set of functions that are trusted by other modules of a computing environment, for example by the host platform 130. The HRoT device 110 and the host platform 130 may be respective independent systems with similar or different setups. Each of the systems may have its own processor, memory and other interfaces. In some embodiments, the host platform 130 may be a Commercial Off-the-Shelf (COTS) device that supports a secure boot sequence. The host platform 130 may include a central processing unit (CPU) or a primary processor 132 and a memory 140. In some embodiments, the host platform 130 may include a Trusted Platform Module (TPM) device 142. The TPM device 142 is a specialized device for hardware authentication, which may include a dedicated microcontroller that provides secure storage, key generation, and cryptographic operations.

The processor 132 may include one or more cores 132-1, 132-2, . . . 132-N. The processor 132 may also include a programmable memory, such as Field Programmable Gate Arrays (FPGA) 134. It will be appreciated that state of the art processors may include programmable elements, such as FPGAs, and/or microprocessors. The FPGA 134 may include a microprocessor, such as Secure Device Manager (SDM) 136, and a boot read-only memory (BootROM) 135. The FPGA 134 and its SDM 136 and BootROM 135 may support a secure boot sequence according to the concepts described herein. In some embodiments, the processor 132 may also include a Platform Controller Hub (PCH) 138. The PCH 138 may be provided as chipsets from INTEL CORPORATION. The PCH 138 may control data paths of a processor 132 to which the PCH 138 belongs. In addition, the PCH may provide functions to control input/output of the processor 132.

Example manufacturers of commercial processors including INTEL and AMD. Processors may include embedded microprocessors (µP) and/or internal Field Programmable Gate Arrays (FPGAs) to handle the secure bring-up of the processor. Such architectures may be referred to as System-on-Chip (SoC) or Multi-Chip Package (MCP). Herein, the processor 132 includes a FPGA 134 that contains a microprocessor 136 and BootRom 135. In this MCP architecture, a boot sequence first brings up the embedded programmable logic using an immutable, internal BootROM 135. The internal BootROM 135 may securely boot a microprocessor 136. The microprocessor 136 may comprise a Secure Device Manager (SDM). As can be appreciated by those of ordinary skill in the pertinent art, the processor 132 may have more or lesser number of on-chip and off-chip storages than what is described in FIG. 1. The SDM 136, in turn, may initialize the remaining communication interfaces and complete the programming of the FPGA 134. Once the FPGA 134 is securely configured, the primary processor 132 is then booted. By leveraging this multi-stage boot sequence, the MCP architecture provides a secure boot-up in addition to the ability to upload custom codes or bitstreams to the processors. In embodiments, a custom Hardware Root-of-Trust (HRoT) can be integrated into the secure boot sequence. The integration of the HRoT and the secure boot sequence enables not only monitoring the boot sequence of the target processor, but also providing dynamic, run-time filtering and control of embedded communications channels.

In embodiments, the SDM 136 may comprise a triple-redundancy processing block that boots off an internal BootROM 135 inside of the FPGA 134. Triple-redundancy (or referred as "triple-modular-redundancy") is based upon a fault-tolerant form of N-modular redundancy. For example, Zynq Ultrascale+ FPGA from XILINX INC uses three soft-core Microblaze processors that each executes the same code. In triple-redundancy, three systems may perform a task or process, and result from the systems can be processed by a majority-voting system in order to produce a single output. When any one of the three systems has an issue, the other two systems can continue processing and/or correct the issue of the failing system. Accordingly, the SDM may load, authenticate, decrypt, and programs the programmable logic of the FPGA in a reliable manner. For example, in some embodiments, all triple-redundancy processing block must agree on the state of the system before continuing the boot process to ensure that there is no security risk.

In some embodiments, the HRoT device 110 may include a multi-core processor 112 and memory 120. The processor 112 of the HRoT device 110 may include one or more cores 112-N configured similarly with the processor 132 of the host platform 130. The processor 112 may also include a boot read-only memory (BootROM) 114, on-chip memory 116, and programmable logic (PL or FPGA) 118. A processor (e.g., 112) of an HRoT device generally requires higher security features than a typical processor being used in a system that does not require higher security. In some embodiments, the HRoT device 110 may comprise a substantially similar architecture with the host platform 130. The BootROM 114 can be a place where the HRoT device 110 loads and executes secure boot codes that initialize a secure booting procedure of the HRoT device 110. The on-chip memory 116 may perform as storage for boot loader codes that are loaded and executed by the secure boot codes. The on-chip memory 116 may be volatile and maintain OS and other application for operation of the processor 112. The PL 118 may perform as a storage for a security monitoring application that is loaded and executed by the boot loader codes. As can be appreciated by those of ordinary skill in the pertinent art, the processor 112 may have more or lesser number of on-chip and off-chip storages than what is described in FIG. 1. It should also be appreciated that the structure of processor 132 in the host platform 130 may have a similar structure with the processor 112 in the HRoT device 110. In another embodiment, the secure boot code and boot loader codes may be loaded and executed in the same on-chip or off-chip memory, for example BIOS flash in an INTEL processor. In addition, a security monitoring app may be loaded and executed in the same memory or storage where the boot codes are loaded. In some embodiments, the HRoT device 110 may include an optional TPM device 122, and the processor 112 may bind to the TPM 122 inside of the HRoT device 110 by using a binding procedure.

In general, MCP-type processors support the storage of an Original Equipment Manufacturer (OEM) and owner-public key for validation of boot images. In some embodiments, rather than storing a public key that may be as long as 4096 bits, for example, the processors (e.g., 132) may maintain a cryptographic hash of the corresponding key. Accordingly, the processors are able to receive the public key from an external entity and prove that the key is what the processors expect to receive. These features may allow a user to create custom boot codes, sign it, and then have the custom boot codes securely load on a target processor. In some embodiments, the custom FPGA bitstream may be encrypted using Advanced Encryption Standard (AES), with the associated key being stored inside of a processor (e.g., 132 in the host platform 130). In some embodiments, the key may be stored in eFuse, battery-backed RAM (BBRAM), or encrypted by the SDM PUF and stored with the image in the processor.

In some embodiments, processors and related components are connected through an integrated Peripheral Component Interconnect Express (PCIe) bus 150. The integrated PCIe bus 150 also may support communication with external devices. In embodiments, through the PCIe bus 150, trust is extended to COTS processors 132 from an HRoT device 110. In embodiments, a proprietary FPGA bitstream can be loaded from an external device through Direct Memory Access (DMA) transactions supported by the PCIe bus 150. For example, DMA transactions may allow the HRoT device 110 directly access the FPGA 134 of the host platform 130. In embodiments, the loading of the proprietary FPGA bitstream may be enhanced by a Physically Unclonable Function (PUF). Accordingly, through the MCP architecture, it may be possible to securely load a proprietary bitstream into the embedded FPGA 134 that can expand the level of introspection, control, and monitoring levels available for the host processor 132. In some embodiments, the custom FPGA bitstream is stored in and loaded from the HRoT device 110.

By leveraging the ability to load a custom boot codes on the host processor 132, an external HRoT device 110 may be tied to the boot sequence of the processor 132. Since the SDM element 136 inside the processor 132 has significant introspection into its address space (including low-level cache), the processor 132 may provide a mean of forwarding its information to a secure HRoT device 110 through the PCIe bus 150. Further, the processor 132 may control the flow of information from external peripherals using the MCP architecture, which can then filter such information based on security policies and requirements provided by the external HRoT device 110 to the processor 132. In the boot sequence of the host processor 132, once programming of the FPGA 134 is done, the SDM 136 may continue to load, authenticate, decrypt, and then transmit the boot image to the Platform Controller Hub (PCH) 138 via an interface bus 152. In some embodiments, the interface bus is an emulated Quad Serial Peripheral Interface (QSPI) bus 152. In embodiments, the PCH 138 may contain an OEM key or owner public key for hash function that are used during the secure boot process. When initialization of the PCH 138 is done, the PCH may continue the secure boot sequence by bringing up the CPU cores 132-1, 132-2, . . . 132-N securely.

Figure 2:
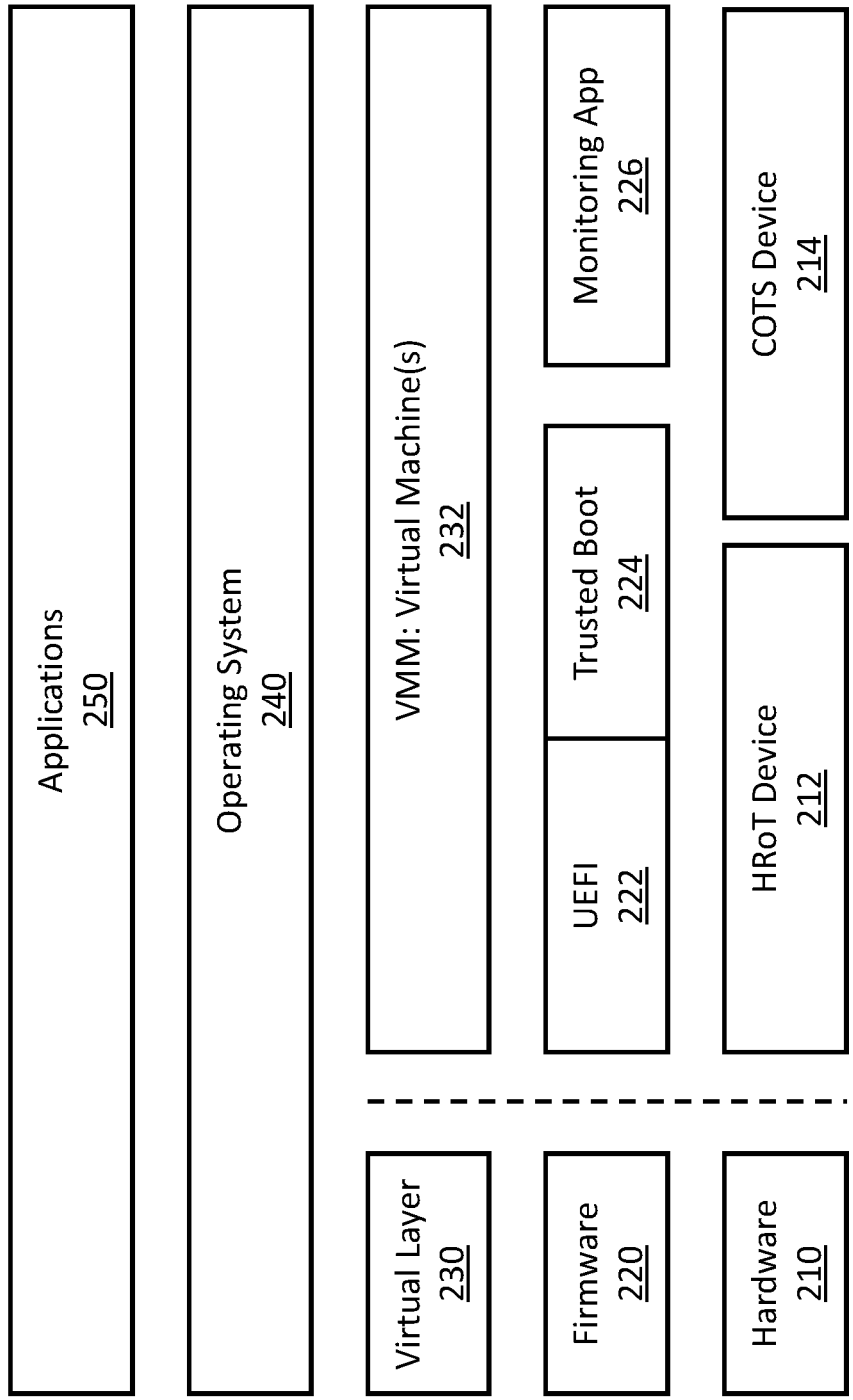
FIG. 2 is a block diagram showing the architecture of a security system according to the concepts described herein.

Referring now to FIG. 2, the architecture of a security system is presented. The architecture 200 may have a plurality of layers including hardware 210, firmware 220, virtual layer 230, operating system 240, and applications 250. The hardware layer 210 of the architecture may include an HRoT device 212 and a COTS device 214. Herein, a processor of the COTS device 214 supports the MCP architecture, as described in conjunction with FIG. 1.

The firmware layer 220 includes Unified Extensible Firmware Interface (UEFI) code 222, trusted boot code 224, and a security monitoring application 226. Here, the UEFI code 222 and the trusted boot code 224 are shown as separate, but during execution, the UEFI 222 and trusted boot 224 may be in a single booting process. In some embodiments, the UEFI code 222 is stored in an electrically erasable programmable ROM (EEPROM). The security monitoring application 226 may perform monitoring of software and hardware of the system. The UEFI code 222 is a secure boot code based upon UEFI specification. The UEFI specification supports advanced boot options and utilizes 64-bit address ranges. The UEFI also supports a Secure Boot mechanism. The Secure Boot mechanism also may provide a way to authenticate codes that are involved with a system startup. The first code executed in a boot sequence on most computer systems is usually stored in some form of programmable read-only memory, such as BootROM 114 in FIG. 1. This code is responsible for identifying the location of the UEFI codes, authenticating and loading the UEFI codes into memory. For example, a host processor (e.g., 132 in FIG. 1) may execute secure boot codes from the BootROM 135. Then the secure boot codes may load and execute the UEFI codes. Once loaded, the UEFI codes can bring in additional code pieces in the form of drivers, optional ROMs, and additional applications, which might be necessary for the continuation of the boot process. In embodiments, a required element that the UEFI must find is the boot loader responsible for loading the OS. The boot loader, once found, is authenticated, loaded, and begins execution. This boot loader will then authenticate and load the OS kernel, which will load the other codes necessary for its functionality. In some embodiments, the drivers and applications for the OS are not required to go through authentication as part of the secure boot process.

The virtual layer 230 may include one or more virtual machines 232. Virtualization technology provides the capability to support concurrent execution of multiple operating system environments. A controlling module or software that handles virtual machines is called a Virtual Machine Monitor (VMM) or a Hypervisor. The VMM is similar to the kernel process for standard Operating Systems, including hardware support. The VMM is responsible for presenting the virtual hardware interface to execution environments, handling scheduling of system resources between environments, and allocating required resources as needed by each environment. In some embodiments, the virtual layer may not be used, and the HRoT device 110 may load an Operating System (OS) 240 on top of the hardware layer 210 and firmware layer 220. The OS may comprise a COTS operating system, such as Microsoft Windows, Linux, MacOS, or any other suitable operating system. After a selected OS is loaded, one or more applications 250 may be loaded an executed.

Figure 3:
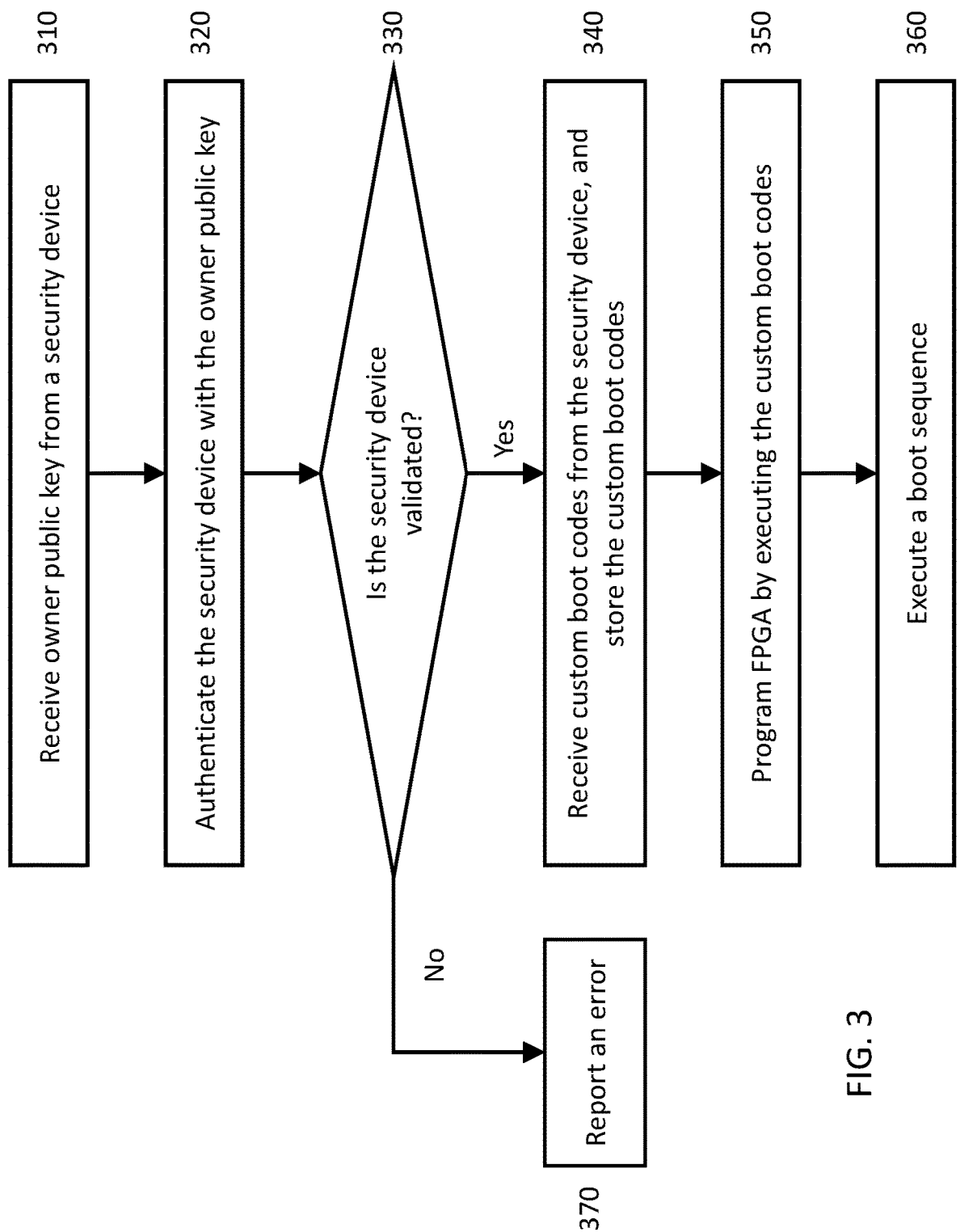
FIG. 3 is a flowchart of a secure booting process according to the concepts described herein.

FIG. 3 is a flow diagram illustrating the secure booting process performed by a security system (e.g., 100 in FIG. 1). Rectangular elements (typified by element 310 in FIG. 3), herein denoted "processing blocks," represent computer software instructions or groups of instructions and diamond shaped elements (typified by element 330 in FIG. 3), herein denoted decision blocks represent computer software instructions or groups of instructions which affect the flow of the processing blocks. The processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring now to FIG. 3, a secure booting process may be carried out by an HRoT device and a COTS device (e.g., the HRoT device 110 and COTS device 130 of FIG. 1). In processing step 310, a host platform or device that supports the MCP architecture (e.g., 130 in FIG. 1) may receive an owner public key (or simply a public key) from a security device (e.g., the HRoT device 110 in FIG. 1). In processing step 320, the host platform 130 may authenticate the security device 110 based upon the received owner public key. In some embodiments, the host platform 130 may generate a hash value from the received public key and compare the hash value with a hash value stored in the host platform, particularly in a memory (e.g., FPGA 134 in FIG. 1) of a processor (e.g., 132 in FIG. 1).

In decision step 330, it is determined whether the security device 110 is validated. If the security device 110 is validated, in processing step 340, the host platform 130 may receive custom boot codes or custom FPGA bitstream from the security device 110, as described at least in conjunction with FIG. 1. The custom boot codes may be encrypted using AES, with the associated key being stored inside of a processor 132. If the security device 110 is not validated, in processing step 370, an error is reported. In processing step 350, the host platform 130 then programs the FPGA 134 using the custom boot codes. In processing step 360, the host platform 130 may continue a boot sequence using the programmed FPGA 134.

Figure 4:
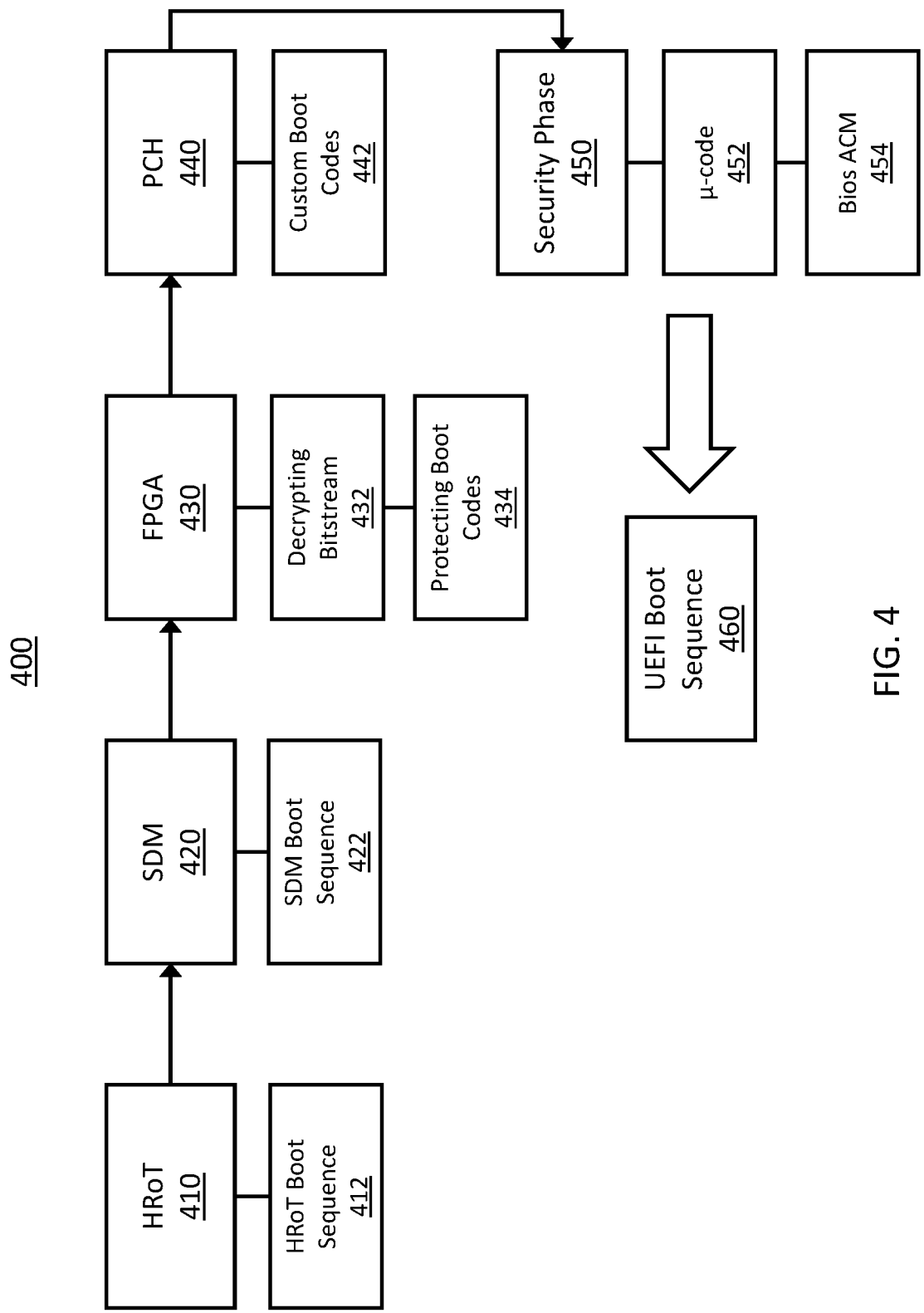
FIG. 4 is a diagram showing a secure booting process incorporating Unified Extensible Firmware Interface (UEFI) according to the concepts described herein.

Referring now to FIG. 4, a secure booting process 400 incorporating UEFI (e.g., 222 in FIG. 2) may be executed by a security system (e.g., 100 in FIG. 1). The secure booting process 400 may start with a secure boot sequence 412 of an HRoT device 410 (or 110 in FIG. 1). The HRoT device 410 may load and execute secure boot codes from a BootROM (e.g., 114 in FIG. 1). Once the secure boot codes are loaded and executed, the secure boot codes may validate UEFI codes that are not unauthenticated. When the UEFI codes are validated, the secure boot codes may load and execute the UEFI codes in the HRoT device 410. When the HRoT device 410 boots with the UEFI codes, the HRoT device 410 may load optional drivers to support initial communications with connected devices. The UEFI code then may validate a boot loader, which is loaded and executed once the boot loader is validated. Finally, OS kernel is validated, loaded, and executed in the HRoT device 410.

On a host platform or COTS device (e.g., 130 in FIG. 1), an internal BootROM (e.g., 135 in FIG. 1) may securely boot an SDM 420 (or 136 in FIG. 1). The traditional UEFI boot sequence with the addition of the SDM may start from this step. A commercial processor will normally boot from internal micro-code stored in on-chip ROM (e.g., BootRom 135 in FIG. 1). As the HRoT is integrated with the UEFI/SDM boot process, the HRoT boot sequence 412 needs to be executed before the UEFI/SDM boot sequence 422. When the HRoT device 410 is booted and validated, the SDM 136 may perform its boot sequence 422. Herein, the SDM 136 may validate the HRoT device 110, as described in conjunction with FIG. 1. Once the HRoT device 110 is validated, the SDM receives custom boot codes or custom FPGA bitstream from the HRoT device 110. The received custom codes may be encrypted. Then, the encrypted custom boot codes may be decrypted using the associated key (432). Then, the host platform 130 may program the FPGA 430 (or 134 in FIG. 1) with the decrypted custom boot codes. With the secure boot process, the system can protect the integrity of boot images (434) that will be executed on the system and used to bring the system out of reset. When the FPGA 430 is programmed, the SDM 420 may continue to load, authenticate, decrypt, and then transmit the boot image to a PCH 440 via an interface bus (e.g., an emulated QSPI bus 152 in FIG. 1). Accordingly, custom boot codes 442 may be stored in the PCH 440. The host platform 130 may continue to a next security phase 450. In some embodiments, the host platform 130 may execute p-code 452 and Bios Authenticated Code Modules (ACM) 454. The uCode 452 comprises the codes on a micro-controller inside the processor (e.g., 132 in FIG. 1) that is responsible for bringing the main processor cores out of reset. The BIOS ACM 454 is part of Trusted eXecution Technology (TXT) from INTEL CORPORATION. The BIOS ACM 454 refers to the first piece of code that the uCode will read, authenticate, and then execute. Once the security phase 450 is done, the host platform 130 may continue a conventional UEFI boot sequence (460).

Once the boot sequence 400 is completed, the FPGA 134 is able to perform monitoring of communications into and out of the SDM 136, as well as the primary processor 132. In some embodiments, this monitoring may be controlled by the HRoT device 110 over the PCIe bus 150. In embodiments, all communications between the FPGA 134 and the HRoT device 110 may be encrypted using cryptographic sessions. The monitoring capability may be available because every device connected through the PCIe bus 150 has a unique address, where the FPGA 134 is able to manage these addresses and forward data from the SDM 136 or the primary processor 132 through the FPGA 134. Other interfaces that are ordinarily tied directly to the processor 132 may also run through the FPGA in this architecture. Accordingly, further filtering on non-PCIe devices is also available.

Figure 5:
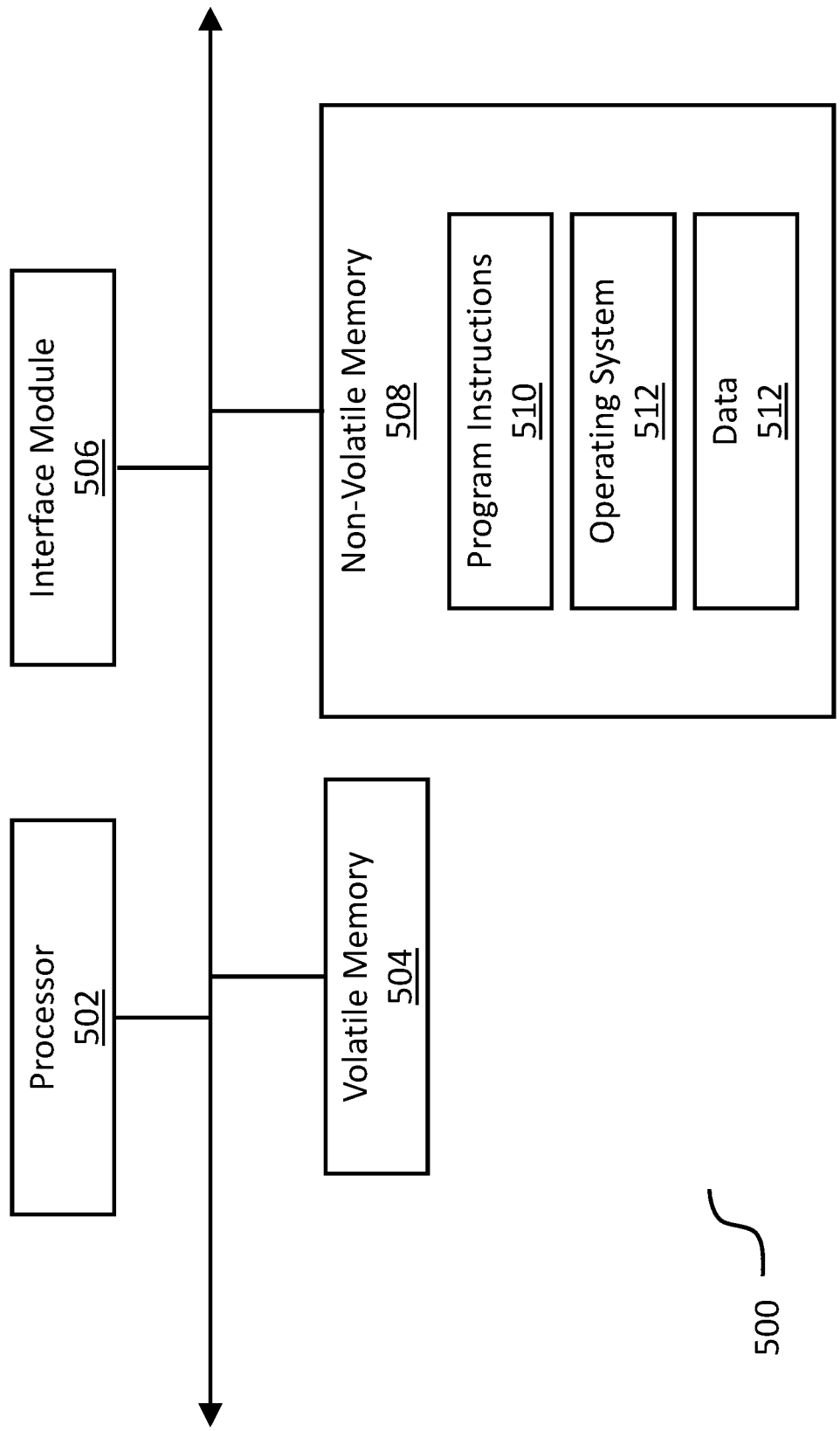
FIG. 5 is an illustrative implementation of a security system described in FIG. 1 according to the concepts described herein.

Referring now to FIG. 5, an illustrative implementation of a processing device 500 which may be suitable to implement the processing techniques (e.g., process 300 in FIG. 3) described herein includes a processor 502, a volatile memory 504, a non-volatile memory 508 (e.g., hard disk) and the interface module 508 (e.g., a user interface, USB interface and so forth). The non-volatile memory 508 stores computer instructions 510, an operating system 512 and data 514. In one example, the computer instructions 510 are executed by the processor 502 out of volatile memory 504 to perform all or part of the processes described herein (e.g., process 300).

The processes described herein (e.g., process 300) is not limited to use with hardware and software of FIG. 1 or FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Accordingly, other embodiments are within the scope of the following claims.

What is claimed is:

1. A method for secure booting, the method comprising:
receiving a public key from a security device;
validating the security device by comparing the received public key with a hash code;
in response to the security device being successfully validated, receiving custom boot codes from the security device and storing the custom boot codes in a microprocessor, wherein the custom boot codes are received only after successful validation of the security device, and further wherein the microprocessor is located in a programmable memory of a primary processor;
programming the programmable memory by executing the custom boot codes; and
executing a boot sequence of the primary processor by the programmable memory.

2. The method of claim 1, wherein the security device comprises a Hardware Root of Trust (HRoT) device.

3. The method of claim 1, wherein the microprocessor comprises a Secure Device Manager (SDM).

4. The method of claim 1, wherein the programmable memory comprises a Field-Programmable Gate Array (FPGA).

5. The method of claim 1, further comprising:
monitoring, by the security device; boot sequence of the primary processor.

6. The method of claim 1, further comprising:
filtering, by the security device, messages to and from the primary processor.

7. The method of claim 1, wherein programming the programmable memory further comprises:
loading, authenticating, decrypting and programming programmable logic of the programmable memory; and
loading, authenticating, decrypting and transmitting image of the programmable memory to a Platform Controller Hub (PCH).

8. The method of claim 1, wherein the security device, the primary processor, and the programmable memory are connected through a Peripheral Component Interconnect Express (PCIe) bus.

9. The method of claim 1, wherein the custom boot codes comprise Physically Unclonable Function (PUF) to protect the custom boot codes.

10. The method of claim 9, wherein the PUF is encrypted by a secure key stored in the security device, and is decrypted by the secure key to protect the custom boot codes.

11. The method of claim 1, wherein the custom boot codes are encrypted with Advanced Encryption Standard (AES).

12. The method of claim 1, wherein executing the boot sequence of the primary processor comprises:
executing a Unified Extensible Firmware Interface (UEFI) boot sequence for the primary processor.

13. A system for secure booting, the system comprising:
a primary processor comprising a Field-Programmable Gate Array (FPGA); and
a security device;
wherein the primary processor is configured to:
  receive a public key from the security device;
  validate the security device by comparing the received public key with a hash code;
  in response to the security device is-being successfully validated, receive custom boot codes from the security device and store the custom boot codes in a Secure Device Manager (SDM), wherein the custom boot codes are received only after successful validation of the security device, and further wherein the SDM is located in the FPGA;
  program the FPGA by executing the custom boot codes; and
  execute a boot sequence for the primary processor by the programmed FPGA.

14. The system of claim 13, wherein the security device, the primary processor, and the FPGA are connected through a Peripheral Component Interconnect Express (PCIe) bus.

15. The system of claim 13, wherein the primary processor further comprises a BootROM, wherein the BootROM executes the custom boot codes stored in the SDM.

16. The system of claim 13, wherein the primary processor further comprises a Platform Controller Hub (PCH).

17. The system of claim 16, wherein the FPGA and the PCH are connected via an emulated Quad Serial Peripheral Interface (QSPI).

18. The system of claim 13, wherein the security device comprises a Hardware Root of Trust (HRoT) device.

* * * * *